United States Patent
Carroll

(10) Patent No.: US 7,107,540 B1
(45) Date of Patent: Sep. 12, 2006

(54) SYSTEM AND METHOD FOR DISPLAYING TEXT AND GRAPHICS IN FRAME BORDERS

(75) Inventor: Michael E. Carroll, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 10/045,918

(22) Filed: Jan. 9, 2002

(51) Int. Cl.
*G06F 3/00* (2006.01)
*G06F 9/00* (2006.01)
*G06F 17/00* (2006.01)

(52) U.S. Cl. .................... 715/747; 715/825; 715/744; 715/810; 715/813; 715/760; 715/780

(58) Field of Classification Search ............... 715/825, 715/744, 810, 813, 811, 780, 781, 760, 800, 715/747
See application file for complete search history.

(56) References Cited

U.S. PATENT DOCUMENTS

| | | | |
|---|---|---|---|
| 4,698,666 A | 10/1987 | Lake, Jr. et al. | 358/22 |
| 4,831,447 A | 5/1989 | Lake, Jr. | 358/183 |
| 5,388,202 A * | 2/1995 | Squires et al. | 715/800 |
| 5,850,232 A | 12/1998 | Engstrom et al. | 345/511 |
| 5,880,740 A | 3/1999 | Halliday et al. | 345/435 |
| 5,892,521 A | 4/1999 | Blossom et al. | 345/501 |
| 5,923,407 A | 7/1999 | Hinton | 355/40 |
| 5,970,496 A * | 10/1999 | Katzenberger | 707/102 |
| 6,141,007 A * | 10/2000 | Lebling et al. | 715/792 |
| 6,195,094 B1 * | 2/2001 | Celebiler | 715/764 |
| 6,339,438 B1 * | 1/2002 | Bates et al. | 715/787 |
| 6,445,400 B1 * | 9/2002 | Maddalozzo et al. | 715/803 |
| 6,728,784 B1 * | 4/2004 | Mattaway | 709/245 |
| 2002/0135621 A1 * | 9/2002 | Angiulo et al. | 345/838 |
| 2002/0191028 A1 * | 12/2002 | Senechalle et al. | 345/800 |

OTHER PUBLICATIONS

Bruce, Betsy , Sams Teach Yourself Macromedia Dreamweaver 3, in 24 Hours Apr. 14, 2000.*
Internet Development Index, frameSet Object. HTML 4.0. World Wide Web Consortium (W3C) Document Object Model (DOM) Level 1. 9 pages [Copied to e-mail message, Mike Carroll to Shelley Beckstrand, Dec. 11, 2001.]
Internet Development Index, frame Object. HTML 4.0. World Wide Web Consortium (W3C) Document Object Model (DOM) Level 1. 12 pages [Copied to e-mail message, Mike Carroll to Shelley Beckstrand, Dec. 11, 2001.]

* cited by examiner

*Primary Examiner*—Kristine Kincaid
*Assistant Examiner*—Ryan Pitaro
(74) *Attorney, Agent, or Firm*—Stephen T. Keohane; Shelley M. Beckstrand

(57) ABSTRACT

Information is presented to a computer user by a graphical user interface including a frame border incorporating textual and/or graphical data. Frame borders are provided with text or graphics which present to the user information indicating which direction a frame will go when clicked, or whether the border is capable of being clicked or dragged. Through the use of such descriptive text and/or graphics, such as an arrow or icon, a user is informed that the frame is a frame, that it may be positioned and opened, the direction in which will open or closed, and what will be uncovered.

30 Claims, 4 Drawing Sheets

SYSTEM AND METHOD FOR DISPLAYING TEXT AND GRAPHICS IN FRAME BORDERS

BACKGROUND OF THE INVENTION

1. Technical Field of the Invention

This invention pertains to computer user interfaces. More particularly, it relates to placing textual and graphical information in the borders of window frames.

2. Background Art

Present implementations of frames include an optional frame border, which may be a border line or a graphic having the appearance of a three dimensional border.

In Lotus Domino, framesets provide a way for designers to display several pages at the same time. A frame contains one page; a frameset is a collection of pages. Page designers can create links between frames. A major advantage of framesets is the ability to leave one page constant as users view or link to other pages.

The hyper text markup language (HTML) defined in HTML 4.0 in World Wide Web Consortium (W3C) Document Object Model (DOM) Level 1 at www.w3.org also provides for frameset elements containing one or more frames. HTML provides the following attributes for borders: borderColor for setting or retrieving the border color of an object; frameBorder for setting or retrieving whether to display a border for a frame; border, borderBottom, borderBottomColor, borderBottomStyle, borderBottomWidth, borderColor, borderLeft, borderLeftColor, borderWidth, and so forth for setting various characteristics of borders. The syntax for accessing the border style of a frame object is:

sBordervalue document.all.oFrame.style.border;

A frameset in HTML provides properties and style attributes including the following: border, for setting or retrieving the space between frames; borderColor, for setting or retrieving the color of the frame object; and borderBottom, borderLeft, borderRight, and borderTop for setting or retrieving the properties of the border.

In HTML, a frameset element is a container for the frame element. An HTML document can contain either the frameset element or the body element. If a user opens a web folder inside a frame and then clicks something in the web folder, the file or folder that the user clicks takes over the entire window. For file types that the browser cannot host, such as .txt files, a separate window in the application host application is opened.

Heretofore, neither Java, HTML nor Lotus Notes has provided for text or graphics images (icons) in frame borders.

These borders provided by Java, Domino, HTML and so forth, present to the user no information indicating that the frame within the border is clickable or draggable, or that the frame even exists. The user, not knowing such, may not open the frame when it would be desirable or advantageous to do so. Applications rely on the users recognizing that there is a frame border in the display, and that it will respond to dragging, clicking or double clicking. Further, there is no hint as to the data which is contained within the frame that will be displayed or the function that will be performed upon dragging or clicking.

There is, therefore, a need in the art for a way to present to the user some indication that the frame within the border is or is not draggable or clickable and the direction in which the frame will go when clicked.

Heretofore the border has not been a hotspot which will respond to some user action, such as being dragged or clicked, and it has been necessary to create a new page in juxtaposition to the frame border in order to provide informational text. The creation of a separate frame to contain the document frame has been required to provide a messages to the user about the content or function of the document frame.

It is an object of the invention to provide an improved system and method for providing information to a computer user regarding the identity and function of frames.

It is a further object of the invention to provide a system and method for placing text and graphic information in frame borders.

It is a further object of the invention to provide a system and method for informing a computer user by way of text and/or graphics in frame borders as to the identity and function of the frame.

It is a further object of the invention to provide a system and method for creating within a frame border a visually apparent hot spot upon which a user may click for opening, launching, sizing and positioning a data source or function contained within a frame.

SUMMARY OF THE INVENTION

A system and method for displaying information to a user by presenting a frame border incorporating textual and/or graphical data.

In accordance with an aspect of the invention, there is provided a computer program product configured to be operable to provide frame information to a user by displaying a frame border and incorporating textual and/or graphical data within the frame border Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiments of the invention, frame borders are provided with text or graphics which present to the user information indicating which direction a frame will go when clicked, or that it can be dragged, or that the border is or is not clickable or draggable.

Figure 1:
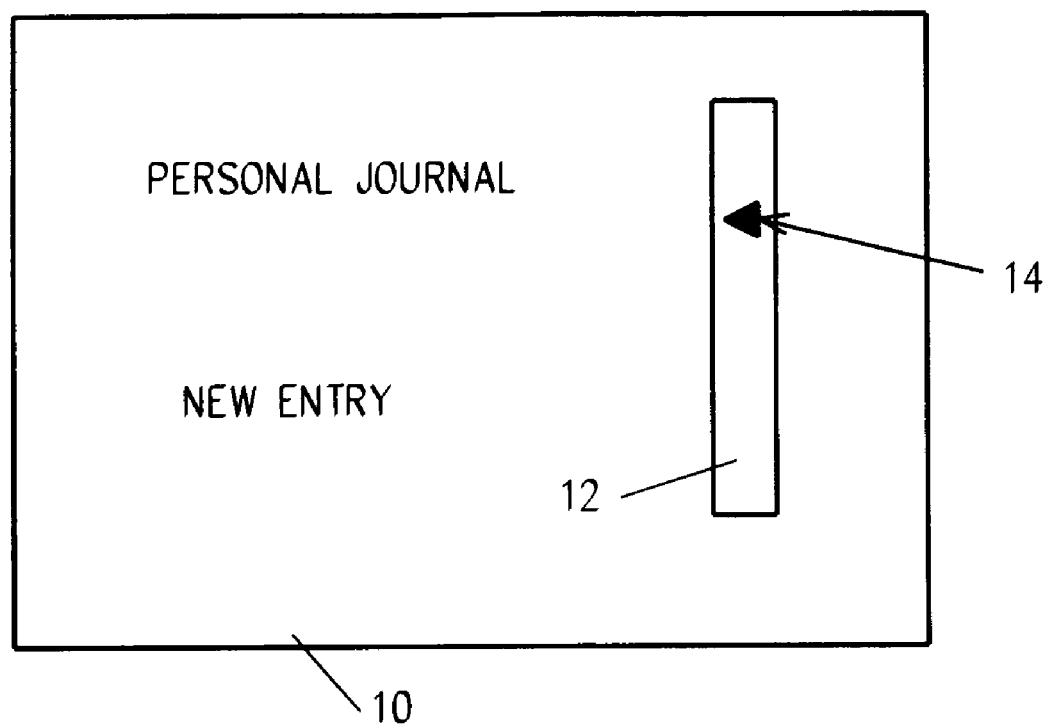
FIG. 1 is a schematic representation of a screen display including a closed frame with a border configured according to a preferred embodiment of the invention.

Referring to FIG. 1, for example, a screen 10 shows a frame border 12 with an arrow graphic 14. If arrow 14 is not present, there is no indication to the user that more content is to be found by clicking or dragging on border 12. In accordance with the preferred embodiments of the invention, through the use of descriptive text and/or graphics, such as an arrow or icon, a user may now be informed that the frame is a frame, that it may be positioned and opened, the direction in which it will open or close, and what will be uncovered.

Figure 2:
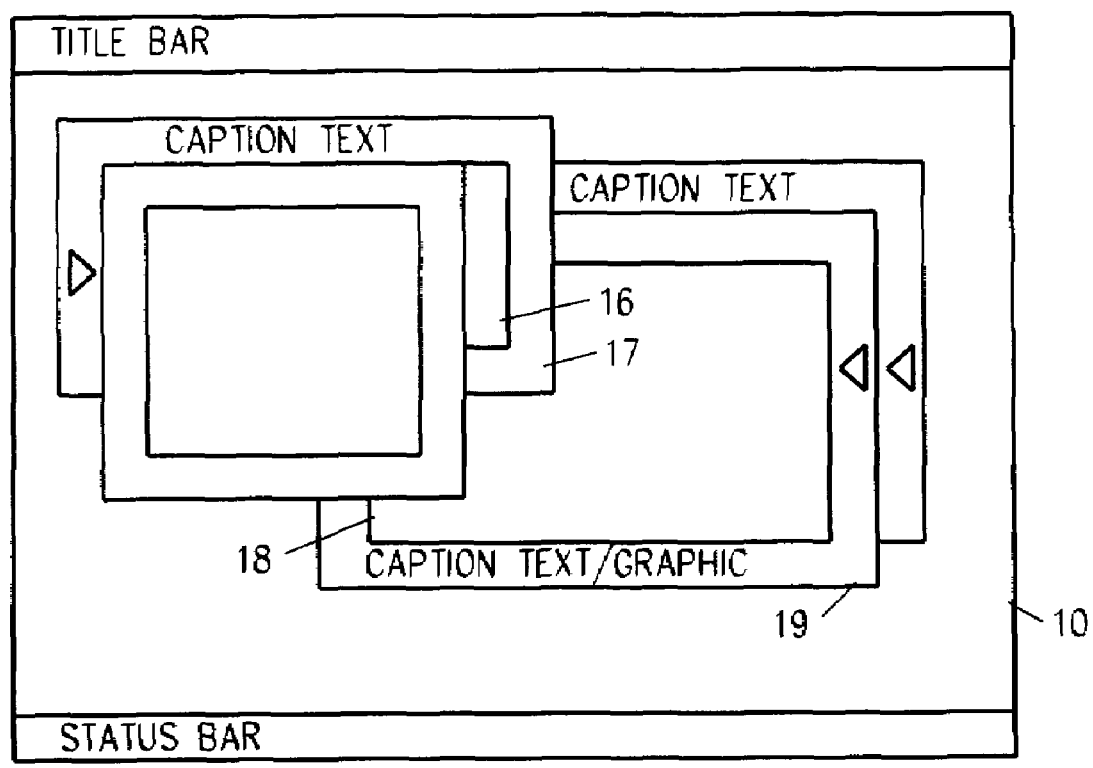
FIG. 2 is a schematic representation of screen display including an open frame in the background with a border configured according to a preferred embodiment of the invention.

In FIG. 1, frame border 12 represents a closed frame. In FIG. 2, several open frames 16, 18 are pushed to the background, and show caption text and graphics in their respective borders 17, 19.

In accordance with exemplary embodiments of the invention, text may positioned in horizontal borders, text and/or graphics may be placed in either or both horizontal and vertical borders as instructional images. In is within the scope of the present invention to also place text in vertical borders, but such is not supported by the present preferred embodiments. Further, graphic or multiple graphic images may be provided as a border which, if clicked, expand on the use of borders. Such borders may be used to open and/or launch applications within a bordered window. Graphics in borders may also be used to embellish the border without having to create a separate frame.

In accordance with the preferred embodiments of the invention, at design time of a frameset, the designer specifies in an edit field the content and position of border text and/or graphics.

In accordance with an exemplary embodiment of the invention, the Notes Frameset Manager, which has previously had several Notes-Client-only features, is provided with frame captioning. This allows the designer to place a caption on any frame comprising a text string and/or an open/close arrow. This caption lives in and consumes space from the space normally occupied by the content of the frame and lies along any moveable edge of the frame. Since frame captioning lives within and consumes space from the area occupied by the frame's content, it coexists with all other aspects of frame and frameset design and has no effect upon them. In particular, captioning coexists with the normal frame borders (the beveled grey or whatever sliders) and, again, lives inside them in the normal frame content area. Indeed, captioning is an addition to a frame's content that doesn't affect the surrounding frames or framesets.

A frame caption lies along one edge of its frame. It has a background color, a color for its text and/or arrow, and text, an open/close arrow, or both. The arrow, if present, points in the direction which the frame can be opened and the arrow is mouse-sensitive—clicking upon the arrow causes the frame to open in the direction indicated by the arrow. Since the arrow is a user control, accessibility access to it is provided.

The user will see frame captioning in two aspects. The first is the specification (the designing) of frame captioning. That is done by the user in Domino Designer/Frameset Design. The second aspect is the runtime rendering and operation of the captioning. That is performed by the Notes Client. Frame captioning is ignored and not rendered by other applications serving-up of frames, such as HTML, by the Domino Server.

Figure 3:
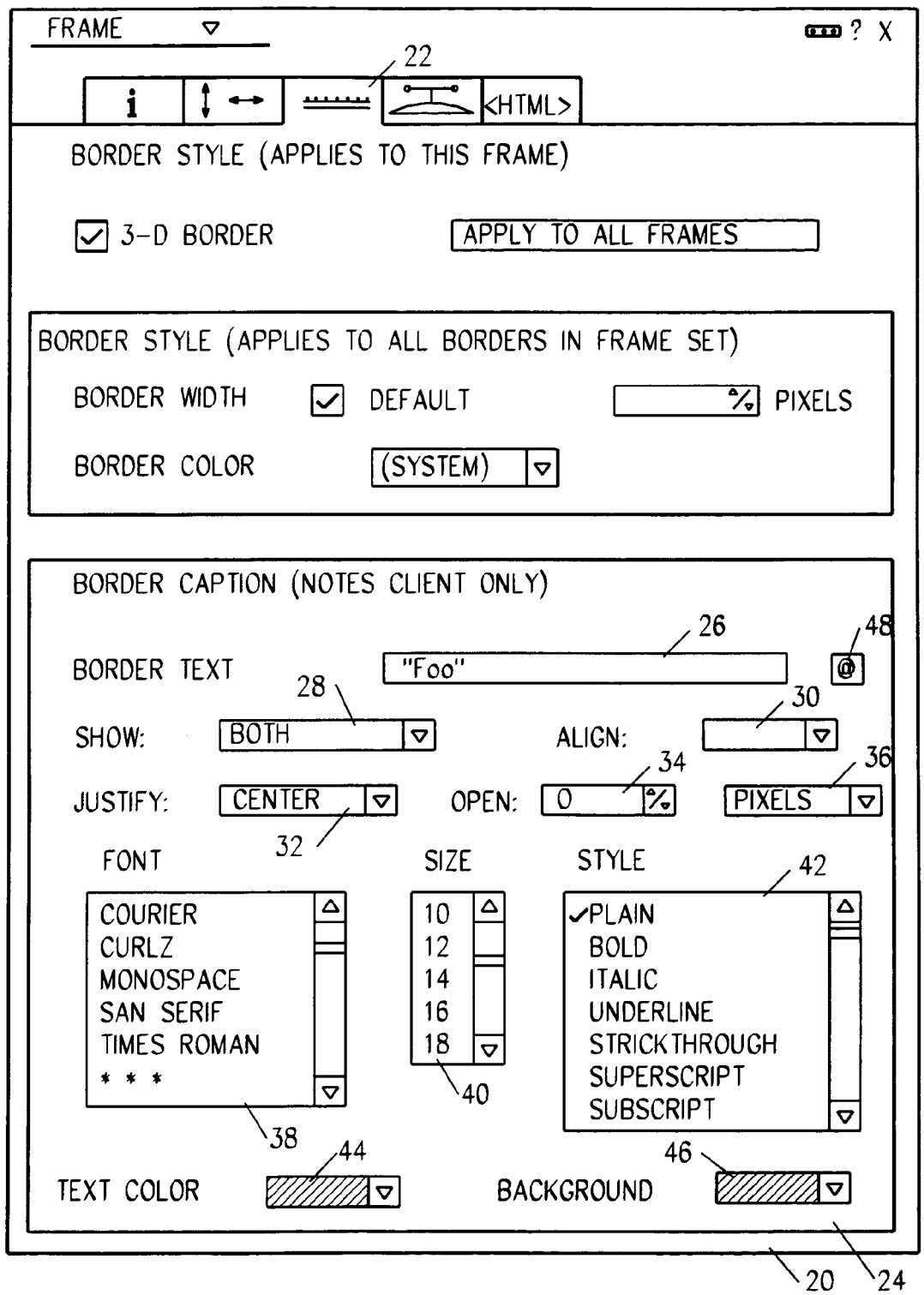
FIG. 3 is a schematic representation of an information box for user specification of frame borders.

Referring to FIG. 3, in accordance with an exemplary embodiment of the invention, in Domino Designer frameset design, the user specifies a caption for any frame, whether the frame is empty, contains a sub (i.e., page, outline, view, etc.) or contains a frameset (i.e., frames). The user specifies which edge of the frame (left, right, top, or bottom) shall contain the caption. The caption renders flush against that side of the frame and obtains its space at the expense of the object contained within the frame. The edge specified must be a moveable edge of the frame. In this exemplary embodiment, if the caption contains text, it must be a horizontal edge (i.e., it must be the top or bottom edge.) The thickness of the caption is the height of the chosen font and font-size plus a few pixels. The width of the caption is whatever is the length of the normal frame content area along the captioned edge.

The user may create, change, or remove the frame caption of a frame by editing the frameset involved. In that frameset, the user selects the frame and brings up the frame border tab 22 of the frame properties information box 20. All specification of frame caption is done in the lower part 24 of this box, beneath the label "Border Caption (Notes Client Only)".

In border text area 26, the user enters a formula or caption text. Border text area 26 displays text, or if the user clicks on @ 48, a pop up formula dialog box. An example of a formula would be @username, and this would cause the name of the user to be displayed as the caption. In show listbox 28, the user specifies whether there is no captioning, text only, arrow only, or both. The user specifies font 38, size 40, style 42, text color 44 and background color 46 for the text and thus of the caption area. When a user has selected other than "None" in show listbox 28, and thus turned captioning on, which edge of the frame will be captioned can be specified in align listbox 30 and any AutoOpen value can be specified in the open numeric field 34 and percent/pixels choice listbox 36. If the caption contains text, the user can specify the font and font size of the text whether the caption contains text, the open/close arrow, or both.

Figure 4:
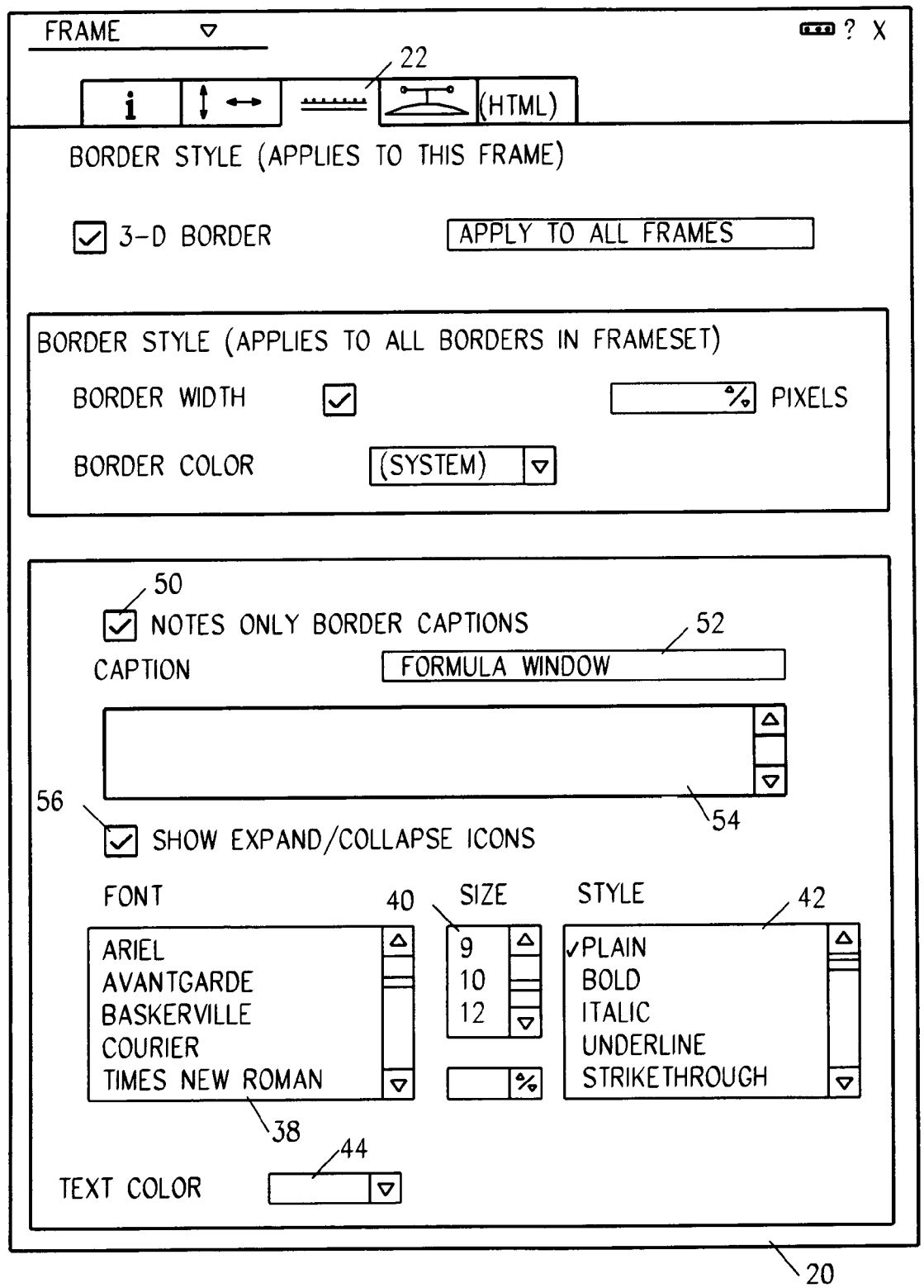
FIG. 4 is a schematic representation of an information box for user specification of Notes only frame border captions.

Referring to FIG. 4, which is a further exemplary embodiment of a border design information box, the designer may specify "Notes Only" 50 border options, in which case infobox 20 is adjusted for the applicable options, to provide a caption window 54 for entry of caption text or a formula such as @username. In this case, the Designer On Disk Structure ODS defines a data fields flag in the frame ODS. This flag has a bit defined for each additional set of information that can be stored at the end of the frame for any new options. Flags define border caption, border font, and border color flags within this word. By using the entire word as flags, this type of data storage can be expanded for any new features. Two of these flags define when Notes only borders 50 are on and when show arrows 56 is on. To insure that new frames (with border captions) work on the web, Notes only information is ignored when on the web.

In accordance with further exemplary embodiments of the invention, the frame border may be drawn around an entire caption at the specified frame border width and in the specified frame border color, frame interior caption color may be specified separate from the border, a frame border may be dragged to open a form, and the border may be shown when the frame is closed. When a frame is closed, the border will appear as wide as the designer made it, and it may include text.

ADVANTAGES OVER THE PRIOR ART

It is an advantage of the invention that there is provided an improved system and method for providing information to a computer user regarding the identity and function of frames.

It is an advantage of the invention that there is provided a system and method for placing text and graphic information in frame borders.

It is an advantage of the invention that there is provided a system and method for informing a computer user by way of text and/or graphics in frame borders as to the identity and function of the frame.

It is an advantage of the invention that there is provided a system and method for creating within a frame border a visually apparent hot spot upon which a user may click for opening, launching, sizing and positioning a data source or function contained within a frame.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran, Lotus Script or the like. And still further, each said step, or a file or object or the like implementing each said step, may be executed by special purpose hardware or a circuit module designed for that purpose.

Accordingly, the scope of protection of this invention is limited only by the following claims and their equivalents.

I claim:

1. A method for displaying in a computer user interface information to a browser user, comprising the steps of:
displaying in said interface a window frame including a window frame border having a plurality of sides, each said side selectable for presentation of textual and graphical data, said textual and graphical data selectively displaying to said user information identifying said window frame border as a window frame border which can be positioned, sized, and opened by said user selectively clicking on and dragging said window frame border; and
selectively incorporating textual and graphical data within any of said sides of said window frame border selectively identifying which of adjacent window frames responds to user selection of said window frame border selectively to open and close said window frame.

2. The method of claim 1, said textual and graphical data displaying to said user at said browser information with respect to the content of said window frame border, and said window frame border containing a graphic which, when present, indicates the direction in which said window frame will open/close when activated; said window frame border existing within area occupied by content of said window frame.

3. The method of claim 2, said data providing a hotspot for selection by said user to open said window frame.

4. The method of claim 3, said hotspot further being selectable by said user to launch an application within said window frame.

5. The method of claim 1, further comprising the step responsive to said user selectively clicking on textual and graphic data in any side of said border of bringing said frame to the forefront.

6. The method of claim 1, further comprising the step of:
providing to a user at design time a window frame properties information box for user definition of frame content in any side of a window frame having a plurality of sides.

7. The method of claim 6, further comprising the step of:
providing in said window frame properties information box for user selection of caption formula and selectively of text, show parameters, caption alignment, justification, font, size, style, text color and background color for display in any side of said window frame border.

8. The method of claim 7, further comprising the step of:
responsive to user selection of Notes only border captions, displaying to said user a caption edit box for entry of caption text.

9. The method of claim 1, further comprising the step of:
responsive to creation of a web enabled window frame border, disabling border captioning.

10. System for displaying information to a user at a computer user interface, comprising:
a window frame border in a browser display at said computer user interface for indicating the presence of a window frame with content; said window frame including a plurality of sides, each said side selectable for presentation of textual and graphical data, said textual and graphical data selectively displaying to said user information identifying said window border as a window frame border which can be positioned, sized, and opened by said user selectively clicking on and dragging said window frame border; and
textual and graphical data selectively presented within any side of said window frame border; said textual and graphical data selectively identifying which of adjacent window frames responds to user selection of said window frame border selectively to open and close said window frame.

11. The system of claim 10, said textual and graphical data displaying to said user information with respect to the content of said window frame border, and said window frame border containing a graphic which, when present, indicates the direction in which said window frame will open/close when activated; said window frame border existing within area occupied by content of said window frame.

12. The system of claim 10, said textual and graphical data displaying to said user information identifying said window frame border as a window frame border which can be positioned, sized, and opened by said user clicking on said window frame border.

13. The system of claim 11, said data providing a hotspot for selection by said user to open said window frame.

14. The system of claim 13, said hotspot further being selectable by said user to launch an application within said window frame.

15. The system of claim 12, said hotspot being responsive to said user clicking on said window frame border of bringing said window frame to the forefront.

16. The system of claim 10, further comprising:
a frame properties information box for user definition of frame content at frame design.

17. The system of claim 16, further comprising:
said frame properties information box further providing for user selection of caption formula, show parameters, caption alignment, justification, font, size, style, text color and background color.

18. The system of claim 17, further comprising: responsive to user selection of Notes only border captions, a caption edit box for entry of caption text.

19. The system of claim 10, further comprising:
control responsive to creation of a web enabled window frame border for disabling border captioning.

20. A program storage device readable by a machine, tangibly embodying a program of instructions executable by a machine to perform method steps for displaying information to a user at an user interface of a computer, said method steps comprising:
displaying in said user interface a window frame border including a plurality of sides, each said side selectable for presentation of textual and graphical data, said textual and graphical data selectively displaying to said user information identifying said window frame border as a window frame border which can be positioned, sized, and opened by said user selectively clicking on and dragging said window frame border; and
selectively incorporating textual and graphical data within any said side of said window frame border.

21. The program storage device of claim 20, said textual and graphical data displaying to said user information with respect to the content of said window frame border selectively including identifying which of adjacent frames responds to user selection of said window frame border selectively to open and close said window frame, and said window frame border containing a graphic which, when present, indicates the direction in which said window frame will open/close when activated; said window frame border existing within area occupied by content of said window frame.

22. The program storage device of claim 20, said textual and graphical data displaying to said user in any side of said window frame border information identifying said window frame border as a window frame border which can be positioned, sized, and opened by said user clicking on said window frame border.

23. The program storage device of claim 21, said data providing a hotspot for selection by said user to open said window frame.

24. The program storage device of claim 23, said hotspot further being selectable by said user to launch an application within said window frame.

25. The program storage device of claim 22, said method steps further comprising the step responsive to said user clicking on said window frame border of bringing said window frame to the forefront.

26. The program storage device of claim 20, said method steps further comprising the step of:
providing to a user at design time a frame properties information box for user definition of frame content of each side of said window frame border.

27. The program storage device of claim 26, said method steps further comprising the step of:
providing in said frame properties information box for user selection of caption formula, show parameters, caption alignment, justification, font, size, style, text color and background color selectively and independently for each side of said window frame.

28. The program storage device of claim 27, said method steps further comprising the step of:
responsive to user selection of Notes only border captions, displaying to said user a caption edit box for entry of caption text.

29. The program storage device of claim 20, said method steps further comprising the step of:
responsive to creation of a web enabled frame border, disabling border captioning.

30. A computer program product for displaying information to a user, comprising:
a computer readable medium;
first program instructions for displaying a window frame border including a plurality of sides, each said side selectable for presentation of textual and graphical data, said textual and graphical data selectively displaying to said user information identifying said window frame border as a window frame border which can be positioned, sized, and opened by said user selectively clicking on and dragging said window frame border; and
second program instructions for selectively incorporating textual and graphical data within a plurality of sides of said window frame border; and wherein
said first and second program instructions are recorded on said medium.

* * * * *